(12) United States Patent
Guen

(10) Patent No.: US 9,203,117 B2
(45) Date of Patent: Dec. 1, 2015

(54) RECHARGEABLE SECONDARY BATTERY

(71) Applicants: SAMSUNG SDI CO., LTD., Yongin-si, Gyeonggi-do (KR); ROBERT BOSCH GMBH, Stuttgart (DE)

(72) Inventor: Minhyung Guen, Yongin-si (KR)

(73) Assignees: SAMSUNG SDI CO., LTD., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 170 days.

(21) Appl. No.: 13/799,108

(22) Filed: Mar. 13, 2013

(65) Prior Publication Data

US 2013/0295416 A1  Nov. 7, 2013

Related U.S. Application Data

(60) Provisional application No. 61/642,606, filed on May 4, 2012.

(51) Int. Cl.
*H01M 2/34* (2006.01)
*H01M 10/42* (2006.01)
*H01M 2/20* (2006.01)
*H01M 2/26* (2006.01)
(Continued)

(52) U.S. Cl.
CPC .......... *H01M 10/4257* (2013.01); *H01M 2/202* (2013.01); *H01M 2/263* (2013.01); *H01M 2/34* (2013.01); *H01M 10/0413* (2013.01); *H01M 10/0431* (2013.01); *H01M 10/058* (2013.01); *H01M 2200/00* (2013.01)

(58) Field of Classification Search
CPC ........................................................ H01M 2/34
USPC ...................... 429/7, 129–133, 136, 138, 247
See application file for complete search history.

(56) References Cited

U.S. PATENT DOCUMENTS

| 8,039,147 B2 | 10/2011 | Lee et al. | |
| 2010/0203363 A1* | 8/2010 | Kwak et al. | 429/7 |
| 2010/0310913 A1* | 12/2010 | Kim et al. | 429/94 |

(Continued)

FOREIGN PATENT DOCUMENTS

| EP | 2 410 594 A1 | 1/2012 |
| EP | 2 602 847 A1 | 6/2013 |

(Continued)

OTHER PUBLICATIONS

European Search Report dated Aug. 7, 2013.

*Primary Examiner* — Kenneth Douyette
*Assistant Examiner* — James Lee
(74) *Attorney, Agent, or Firm* — Lee & Morse, P.C.

(57) ABSTRACT

A battery includes an electrode assembly including a pair of electrodes and having a first side, a second side, a third side, and a fourth side, the second side being opposite the first side; a short circuit induction member, the short circuit induction member being attached to and electrically connected to one electrode of the electrodes, the short circuit induction member including a first portion, a second portion, and a third portion, the third side of the electrode assembly facing the third portion, the third portion mechanically and electrically connecting the first portion to the second portion, the electrode assembly being interposed between the first portion and the second portion such that the first side of the electrode assembly is between the first portion and the second side, the fourth side of the electrode assembly being at least partially exposed by the short circuit induction member; and a case.

18 Claims, 10 Drawing Sheets

(51) Int. Cl.
*H01M 10/04* (2006.01)
*H01M 10/058* (2010.01)

(56) References Cited

U.S. PATENT DOCUMENTS

2011/0212350 A1* 9/2011 Sato et al. ................ 429/56
2012/0021274 A1* 1/2012 Kim et al. ................ 429/151
2013/0101875 A1 4/2013 Kim et al.
2013/0115488 A1 5/2013 Han et al.

FOREIGN PATENT DOCUMENTS

| KR | 10 2008-0019311 A | 3/2008 |
| KR | 10 2011-0065373 A | 6/2011 |

* cited by examiner

RECHARGEABLE SECONDARY BATTERY

CROSS-REFERENCE TO RELATED APPLICATION

This application claims priority to U.S. Provisional Application No. 61/642,606, filed in the U.S. Patent and Trademark Office on May 4, 2012, and entitled "RECHARGEABLE SECONDARY BATTERY," which is hereby incorporated by reference herein in its entirety for all purposes.

FIELD

Embodiments relate to a rechargeable secondary battery.

BACKGROUND

Lithium ion secondary batteries are used in small electronic devices such as notebook computers and cellular phones. Such lithium ion secondary batteries are in many respects superior to the other types of secondary batteries, e.g., in terms of power, capacity, and weight. Lithium ion secondary batteries may also be used in hybrid vehicles and electric vehicles. Lithium ion secondary batteries for vehicles should satisfy the requirements of safety and reliability under harsh conditions.

SUMMARY

Embodiments are directed to a battery, including an electrode assembly, the electrode assembly including a pair of electrodes and a separator interposed therebetween, the electrode assembly having a first side, a second side, a third side, and a fourth side, the second side being opposite the first side; a short circuit induction member, the short circuit induction member being attached to and electrically connected to one electrode of the electrodes, the short circuit induction member including a first portion, a second portion, and a third portion, the third side of the electrode assembly facing the third portion, the third portion mechanically and electrically connecting the first portion to the second portion, the electrode assembly being interposed between the first portion and the second portion such that the first side of the electrode assembly is between the first portion and the second side, the fourth side of the electrode assembly being at least partially exposed by the short circuit induction member; and a case, the electrode assembly and the short circuit induction member being disposed in the case.

The battery may further include a cap plate, the cap plate closing an opening in the case. The third portion of the short circuit induction member may be interposed between the third side of the electrode assembly and the cap plate.

The battery may further include a terminal part, the terminal part including a current collector, a terminal, and a fuse, the fuse being formed on the current collector.

The fuse may be disposed adjacent to the third portion of the short circuit induction member.

The third portion of the short circuit induction member may include a pocket therein, the pocket facing the fuse.

The third portion of the short circuit induction member may have a length that is substantially the same as a length of the first portion and a length of the second portion, the third portion being connected to the first and second portions along their respective lengths, and the pocket may have a length that is substantially the same as a length of the third portion.

The second side of the electrode assembly may be between the second portion of the short circuit induction member and the first side of the electrode assembly.

The short circuit induction member may substantially cover the first side and the second side of the electrode assembly.

The third portion of the short circuit induction member may bridge the first portion and the second portion.

The short circuit induction member may be a single piece that includes the first portion, the second portion, and the third portion.

The first, second, and third portions of the short circuit induction member may be integrally formed.

The electrode assembly may include a pressed end at an uncoated portion of the one electrode, a thickness of the pressed end of the electrode assembly being less than a thickness of a coated portion of the electrode assembly, and the short circuit induction member may be attached to and electrically connected to the uncoated portion of the one electrode.

The first portion of the short circuit induction member may have a first region and a second region, the first region extending along the first side of the electrode assembly, the second region being bent from the first region and extending along the pressed end of the electrode assembly.

The second portion of the short circuit induction member may have a first region and a second region, the first region of the second portion extending along the second side of the electrode assembly, the second region of the second portion being bent from the first region of the second portion and extending along the pressed end, the pressed end being interposed between the second region of the second portion and the second region of the first portion.

The third portion of the short circuit induction member may have a length that is less than a length of the first portion and a length of the second portion, such that the third portion exposes a portion of the third side of the electrode assembly.

The third portion of the short circuit induction member may include a first section and a second section, each of the first and second sections mechanically and electrically connecting the first portion to the second portion, the first section and the second section being spaced apart with a gap therebetween.

The battery may further include a first terminal part, the first terminal part including a first current collector, a first terminal, and a first fuse, the first fuse being formed on the first current collector; and a second terminal part, the second terminal part including a second current collector, a second terminal, and a second fuse, the second fuse being formed on the second current collector. The first fuse may be disposed adjacent to the third side of the electrode assembly, the first section of the short circuit induction member being interposed between the first fuse and the third side of the electrode assembly, and the second fuse may be disposed adjacent to the third side of the electrode assembly, the second section of the short circuit induction member being interposed between the second fuse and the third side of the electrode assembly.

The first section of the short circuit induction member may include a first pocket therein, the first pocket facing the first fuse, and the second section of the short circuit induction member may include a second pocket therein, the second pocket facing the second fuse.

The third portion of the short circuit induction member may further include a third section that mechanically and electrically connects the first portion to the second portion, the third section being between the first section and the second section, the first section and the third section may be spaced apart with a first gap therebetween, and the third section and the second section may be spaced apart with a second gap therebetween.

The case may be electrically connected to another electrode of the electrodes, and the short circuit induction member may be interposed between the case and the electrode assembly.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
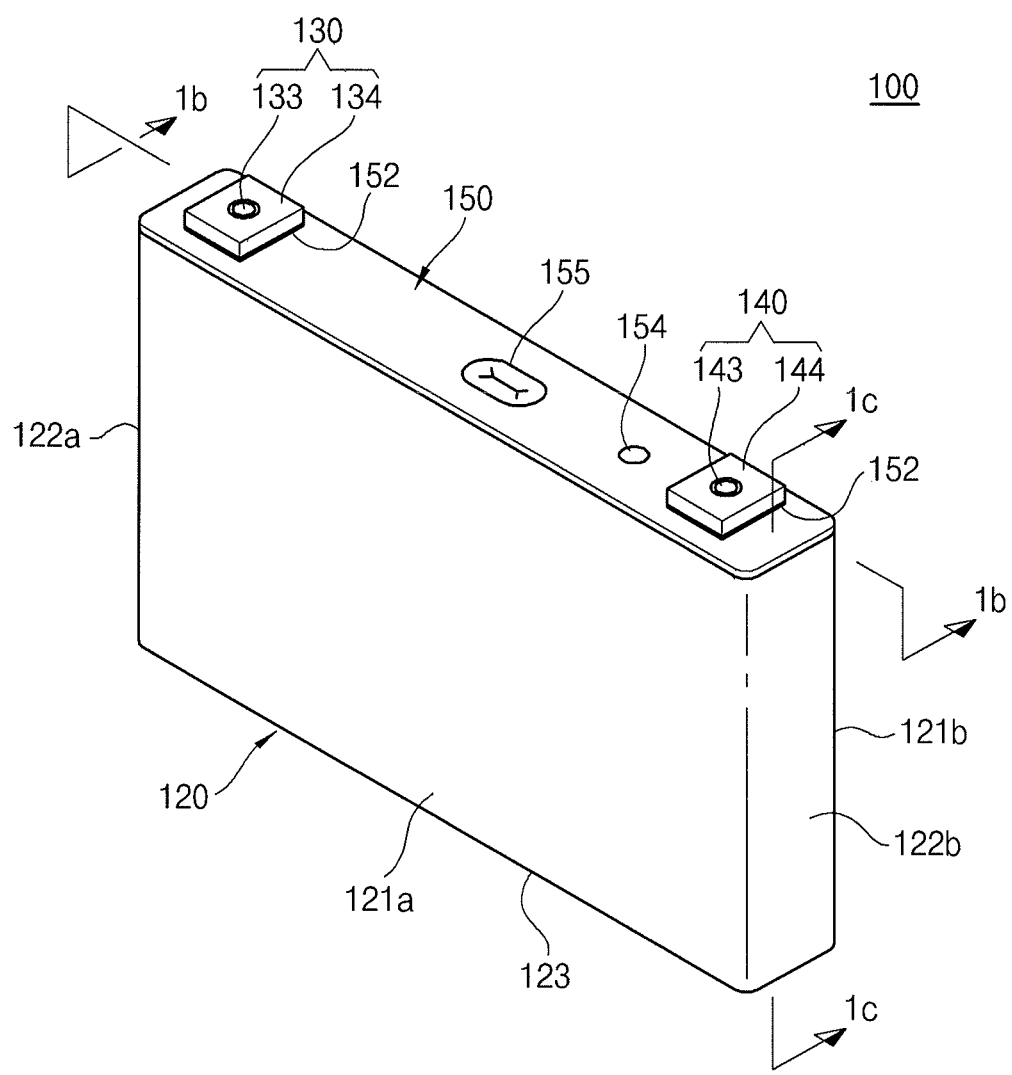
FIG. 1A illustrates a perspective view of a rechargeable secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1B:
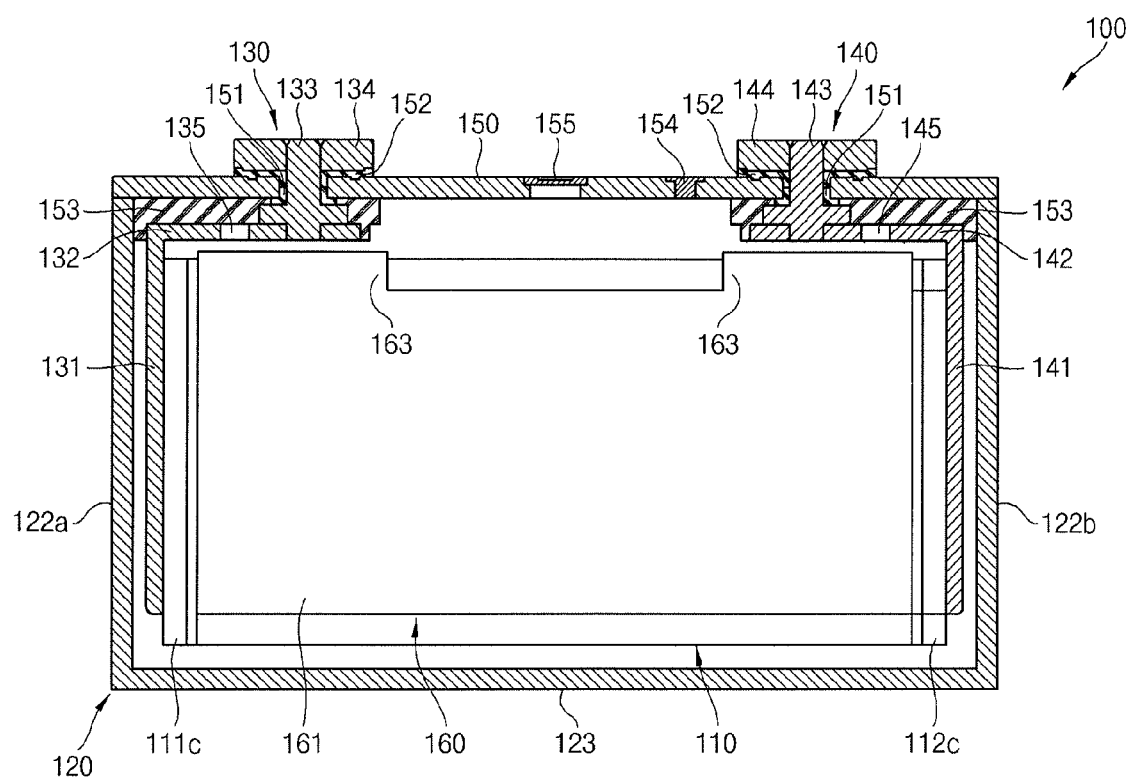
FIG. 1B illustrates a sectional view taken along line 1b-1b of FIG. 1A.

FIG. 1A illustrates a perspective view of a rechargeable secondary battery according to an embodiment. FIG. 1B illustrates a sectional view taken along line 1b-1b of FIG. 1A, and FIG. 1C illustrates a sectional view taken along line 1c-1c of FIG. 1A.

Figure 1C:
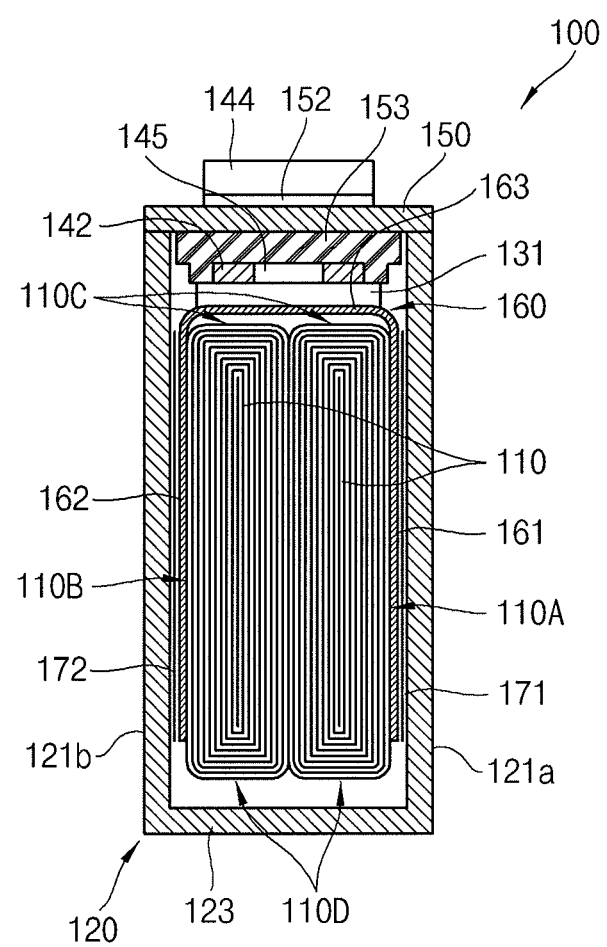
FIG. 1C illustrates a sectional view taken along line 1c-1c of FIG. 1A.

Referring to FIGS. 1A to 1C, a rechargeable secondary battery 100 according to the present example embodiment includes an electrode assembly 110, a case 120, a first terminal part 130, a second terminal part 140, a cap plate 150, and a short circuit induction member 160.

FIG. 1C shows two electrode assemblies 110. In other implementations, the number of electrode assemblies may be less than or more than two. Also, the case 120 may be called a can. The case 120 may include the cap plate 150.

In the present example embodiment, the electrode assembly 110 has an approximately flat shape. Also, the electrode assembly 110 has a pair of long side areas 110A and 110B facing each other and a pair of short side areas 110C and 110D connecting the long side areas 110A and 110B to each other and facing each other. Each of the long side areas 110A and 110B has a relatively wide area when compared to that of each of the short side areas 110C and 110D. As described below in detail, the electrode assembly 110 includes a first uncoated area 111c (a first uncoated portion) that is not coated with a first active material and a second uncoated area 112c (a second uncoated portion) that is not coated with a second active material. The first and second uncoated areas 111c and 112c extend by a predetermined length in directions opposite to each other. Thus, the first uncoated portion 111c extends and protrudes by a predetermined length in one direction through the long side areas 110A and 110B and the short side areas 110C and 110D. Also, the second uncoated portion 112c extends and protrudes by a predetermined length in the other direction through the long side areas 110A and 110B and the short side areas 110C and 110D.

In the present example embodiment, the case 120 includes a pair of long side walls 121a and 121b, each having an approximately flat shape, facing each other, a pair of short side walls 122a and 122b connecting the long side walls 121a and 121b to each other and facing each other, and one bottom wall 123 connecting the long side walls 121a and 121b to the short side walls 122a and 122b. The case 120 has an opened upper portion. The electrode assembly 110 together with electrolyte is received in the case 120. The first and second uncoated areas 111c and 112c of the electrode assembly 110 face the pair of short side walls 122a and 122b, respectively. The case 120 may be formed of one selected from aluminum (Al), aluminum alloy, copper (Cu), copper alloy, iron (Fe), iron alloy, stainless steel (SUS), equivalents thereof, etc.

In the present example embodiment, the first terminal part 130 is electrically connected to the first uncoated area 111c of the electrode assembly 110. In an implementation, the first terminal part 130 includes a first area 131 welded to the first uncoated area 111c, a second area 132 bent from the first area 131 in an approximately horizontal direction and disposed on the short side area 110C of the electrode assembly 110, a third area 133 coupled to the second area 132 to pass through the cap plate 150, and a fourth area 134 coupled to the third area 133. Each of the first and second areas 131 and 132 may be called a current collecting plate, the third area 133 may be called a coupling terminal, and the fourth area 134 may be called an electrode terminal. The first area 131 may be welded to the first uncoated area 111c through, e.g., resistance welding, laser beam welding, and its equivalent.

A fuse 135 may be disposed in the second area 132. The fuse 135 may be realized by a hole or a cut region defined in the second area 132, the fuse 135 representing an area having the lowest sectional area (an area having the highest resistance) of the second area 132. The fuse 135 may be melted by an overcurrent when the rechargeable secondary battery is overcharged. When the fuse 135 is melted by the overcurrent, the overcurrent through the first terminal part 130 may be blocked.

A certain area of the fourth area 134 may be directly electrically connected to the cap plate 150. In an implementation, the fourth area 134 is connected to the cap plate 150 through a high resistance member (not shown) such as a stainless steel. Thus, the cap plate 150 and the case 120 may have the same polarity (e.g., a positive pole) as the first terminal part 130.

In the present example embodiment, the second terminal part 140 is electrically connected to the second uncoated area 112c of the electrode assembly 110. In an implementation, the second terminal part 140 includes a first area 141 welded to the second uncoated area 112c, a second area 142 bent from the first area 141 and disposed on the short side area 110C of the electrode assembly 110, a third area 142 coupled to the second area 142 to pass through the cap plate 150, and a fourth area 144 coupled to the third area 143. The first area 141 may be welded to the second uncoated area 112c through one of resistance welding, laser beam welding, or its equivalent.

A fuse 145 may be disposed on the second area 142. The fuse 145 may be realized by a hole or a cut region defined in the second area 142, the fuse 145 representing an area having the lowest sectional area (an area having the highest resistance) of the second area 142. The fuse 145 may be melted by an overcurrent when the rechargeable secondary battery is overcharged. When the fuse 135 is melted by the overcurrent, the overcurrent through the second terminal part 140 may be blocked. Each of the first and second areas 141 and 142 may be called a current collecting plate, the third area 143 may be called a coupling terminal, and the fourth area 144 may be called an electrode terminal. The first area 141 may be welded to the first uncoated area 112c through, e.g., resistance welding, laser beam welding, or its equivalent.

In an implementation, a fuse may be disposed on only the first terminal part 130, i.e., the fuse 135 may be used alone, and fuse 145 may be omitted. Aluminum has a melting point less than that of copper. Each of the first and second areas 131 and 132 of the first terminal part 130 may be formed of an aluminum, and each of the first and second areas 141 and 142 of the second terminal part 140 may be formed of copper. The aluminum may have a melting point of about 659° C., and the copper may have a melting point of about 1,083° C. Thus, in case where the same overcurrent flows into the aluminum and copper, the aluminum may be melted before the copper.

In the present example embodiment, the cap plate 150 covers the opened portion of the case 120 so that the first and second terminal parts 130 and 140 are exposed to the outside or protrude through the cap plate 150. A boundary between the case 120 and the cap plate 150 may be welded using laser beam. The third areas 133 and 143 of the first and second terminal parts 130 and 140 may pass through the cap plate 150. Also, a sealing gasket 151 may be disposed on an outer circumference of each of the third areas 133 and 143. Thus, the third areas 133 and 143 of the first and second terminal parts 130 and 140 may be insulated from the cap plate 150. As described above, when the fourth area 134 is connected to the cap plate 150 through the high resistance member, the cap plate 150 and the case 120 may have the same polarity (e.g., a positive pole). Furthermore, an upper insulation member 152 may be disposed between the fourth areas 134 and 144 and the cap plate 150. Also, a lower insulation member 153 may be disposed between the second areas 132 and 142 and the cap plate 150.

An electrolyte plug 154 may be coupled to the cap plate 150. A safety vent 155 having a relatively thin thickness may be defined in the cap plate 150. The cap plate 150 may be formed of the substantially the same material as the case 120.

In the present example embodiment, the short circuit induction member 160 is electrically connected to the electrode assembly 110, and also approximately covers the pair of long side areas 110A and 110B and one short side area 110C of the electrode assembly 110. In an implementation, the short circuit induction member 160 is electrically connected to the second uncoated area 112a of the electrode assembly 110. Thus, when the second uncoated area 112c has a negative polarity, the short circuit induction member 160 may also have a negative polarity.

In the present example embodiment, the short circuit induction member 160 includes a pair of long side portions 161 and 162 approximately covering the two long side areas 110A and 110B of the electrode assembly 110 and one short side portion 163 approximately covering the one short side area 110C of the electrode assembly 110. The short side portion 163 electrically and mechanically connects the pair of long side portions 161 and 162 to each other. Thus, one long side portion 161 of the short circuit induction member 160 is disposed between the long side area 110A of the electrode assembly 110 and the long side area 121a of the case 120. Also, the other long side portion 162 of the short circuit induction member 160 is disposed between the long side area 110B of the electrode assembly 110 and the long side area 121b of the case 120. Furthermore, the short side portion 163 of the short circuit induction member 160 is disposed between the short side area 110C of the electrode assembly 110 and the cap plate 150.

The short circuit induction member 160 may be formed of, e.g., one selected from copper (Cu), copper alloy, aluminum (Al), aluminum alloy, iron (Fe), iron alloy, stainless steel (SUS), and equivalents thereof. For example, when the case 120 is formed of the aluminum (Al) or aluminum alloy, the short circuit induction member 160 may be formed of the copper (Cu) or copper alloy. When the short circuit induction member 160 is formed of the copper (Cu) or copper alloy, the short circuit induction member 160 may be easily welded to the second uncoated portion 112c formed of copper. Furthermore, the short circuit induction member 160 may have a thickness of about 50 μm to about 400 μm. In a range of above-described value, heat generation and the occurrence of fire in the rechargeable secondary battery 100 may be minimized when, during a penetration test, a nail penetrates the rechargeable secondary battery 100 to cause a short circuit. The nail penetration represents that the nail penetrates the long side area 121a or 121b of the case 120, the short circuit induction member 160, and the electrode assembly 110.

As described above, the short circuit induction member 160 according to an embodiment may include the pair of long side portions 161 and 162 and the one short side portion 163, and the pair of long side portions 161 and 162 may be electrically and mechanically connected to each other by at least one short side portion 163. Thus, a flow path of a short circuit current may be varied when the nail penetrates the rechargeable secondary battery 100. Thus, heat generation and occurrence of fire in the rechargeable secondary battery 100 may be minimized when the nail penetrates the rechargeable secondary battery 100.

Also, when the nail penetrates the rechargeable secondary battery 100, heat generated in the nail penetration region may be dispersed into a wide area along the short circuit induction member 160. Thus, the heat may not be concentrated into the nail penetration region.

One short side portion 163 of the short circuit induction member 160 may be disposed under the second area 132 of the first terminal part 130. For example, the short side portion 163 may be disposed under the fuse 135. Also, the other short side portion 163 of the short circuit induction member 160 may be disposed under the second area 142 of the second terminal part 140. Thus, the short side portion 163 may be disposed under the fuse 145.

According to the present embodiment, an arc or fuse-melted material generated when the fuse 135 and 145 is melted by overcharging of the rechargeable secondary battery 100 may not be transferred toward the electrode assembly 110 by the short side portion 163 of the short circuit induction member 160. Thus, the short side portion 163 of the short circuit induction member 160 may serve as a blocking wall or a mask. Thus, the occurrence of fire and gas generation (which may occur when the fuse of the rechargeable secondary battery 100 is melted) may be prevented.

In the present example embodiment, an insulation member 171, which may be formed of, e.g., an insulating paper, etc., is disposed between one long side portion 161 of the short circuit induction member 160 and the long side area 121a of the case 120. Also, an insulation member 172, which may be formed of, e.g., an insulating paper, etc., is disposed between the other long side portion 162 of the short circuit induction member 160 and the long side area 121b of the case 120. Thus, the short circuit induction member 160 and the case 120 are not short-circuited with each other under normal operation. The case 120 having a positive pole and the short circuit induction member 160 having a negative polarity are prevented from being short-circuited with each other by the insulation members 171 and 172 in normal circumstances, i.e., during normal use.

Figure 2A:
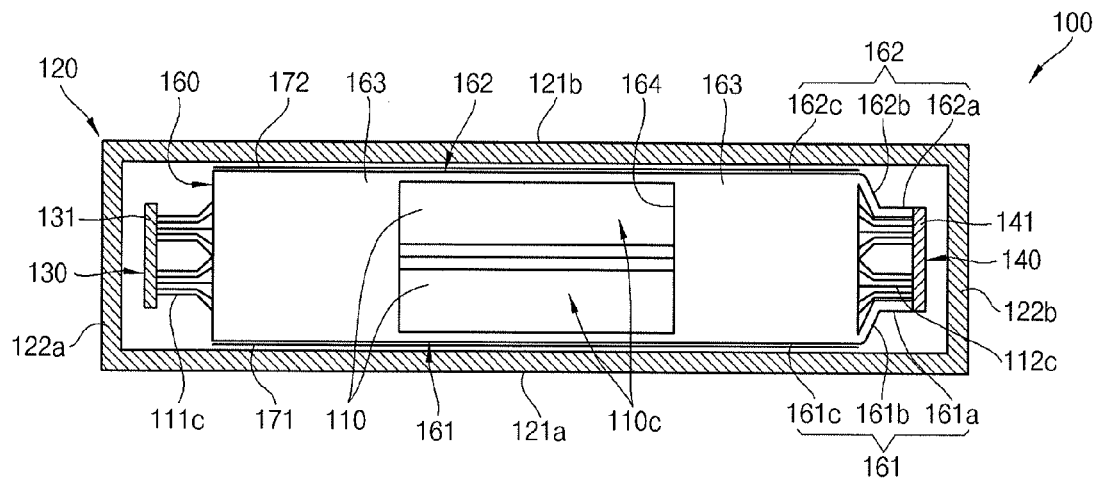
FIG. 2A illustrates a longitudinal sectional view of a coupling relationship between an electrode assembly and a short circuit induction member in the rechargeable secondary battery according to an embodiment.
Figure 2B:
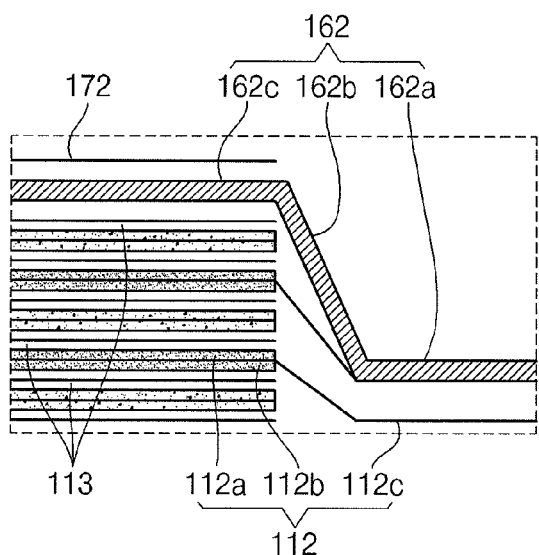
FIGS. 2B and 2C illustrate partially enlarged sectional views.
Figure 2C:
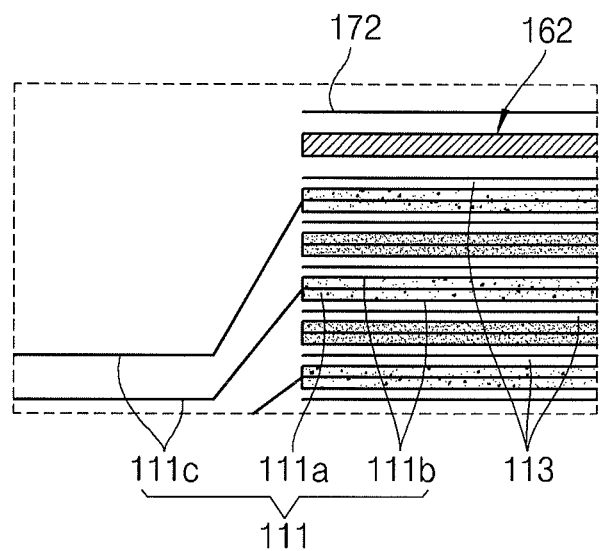

FIG. 2A illustrates a longitudinal sectional view of a coupling relationship between an electrode assembly and a short circuit induction member in the rechargeable secondary battery according to an embodiment, and FIGS. 2B and 2C illustrate partially enlarged sectional views.

Referring to FIG. 2A, the pair of long side portions 161 and 162 of the short circuit induction member 160 are electrically connected to the second uncoated portion of the electrode assembly 110. In an implementation, the second uncoated portion 112c of the electrode assembly 110 is pressed, and the second uncoated portion 112c may have a relatively small thickness. Accordingly, the short circuit induction member 160 may have a bent shape so that the short circuit induction member 160 is easily connected to the second uncoated portion 112c having the relatively small thickness. In an implementation, the pair of long side portions 161 and 162 of the short circuit induction member 160 includes first areas 161a and 162a respectively connected to the second uncoated portion 112c of the electrode assembly 110, second areas 161b and 162b respectively bent from the first areas 161a and 162a to extend by a predetermined length, and third areas 161c and 162c respectively bent from the second areas 161b and 162b to cover the long side areas 110A and 110B of the electrode assembly 110.

The pair of long side portion 161 and 162 may be electrically and mechanically connected to each other by the two short side portions 163. The two short side portions 163 may be integrated with the two long side portions 161 and 162. In another implementation, the two short side portions 163 may be separately provided and respectively welded to the two long side portions 161 and 162. Furthermore, a cut portion 164 may be defined between the two short side portions 163, and the short side area 110C of the electrode assembly 110 may be exposed through the cut portion.

As shown in FIG. 2A, the first area 131 of the first terminal part 130 may be electrically connected to the first uncoated portion 111c of the electrode assembly 110. The first area 141 of the second terminal part 140 may be electrically connected to the second uncoated portion 112c of the electrode assembly 110.

Referring to FIGS. 2B and 2C, the electrode assembly 110 according to the present example embodiment includes a first electrode plate 111, a second electrode plate 112, and a separator 113 disposed between the first and second electrode plates 111 and 112. The electrode assembly 110 may have shape such as, e.g., a wound jelly roll shape or a stacked shape.

When the first electrode plate 111 is a positive electrode plate, the second electrode plate 112 may be a negative electrode plate. On the other hand, when the first electrode plate 111 is a negative electrode plate, the second electrode plate 112 may be a positive electrode plate. In an implementation, the first electrode plate 111 includes a first metal foil 111a and a first active material 111b. When the first electrode plate 111 is the positive electrode plate, the first metal foil 111a may, e.g., be aluminum or aluminum alloy, and the first active material 111b may be, e.g., a lithium-based oxide. In an implementation, the second electrode plate 112 includes a second metal foil 112a and a second active material 112b. When the second electrode plate 112 is the negative electrode plate, the second metal foil 112a may be, e.g., copper or copper alloy, and the second active material 112b may be, e.g., graphite. In an implementation, the separator 113 is disposed between the first electrode plate 111 and the second electrode plate 112. The separator 113 may be formed of, e.g., porous PE (polyethylene), PP (polypropylene), etc. The separator 113 may be disposed on both side surfaces of the first electrode plate 111 or both side surfaces of the second electrode plate 112. The separator 113 may be disposed on the outermost areas of the electrode assemblies 110 to prevent predetermined areas of the electrode assemblies 110 from being directly short-circuited with the cap plate 150 or the short circuit induction member 160.

In the present example embodiment, the first electrode plate 111 includes a first uncoated area 111c (a first uncoated portion) that is not coated with a first active material 111b. The first uncoated area 111c may protrude to the outside through one side of the separator 113 and face the short side area 122a of the case 120. The second electrode plate 112 includes a second uncoated area 112c (a second uncoated portion) that is not coated with a second active material 112b. The second uncoated area 112c may protrude to the outside through the other side of the separator 113 and face the short side area 122b of the case 120. Thus, the first and second uncoated areas 111c and 112c may protrude and extend in directions opposite to each other on the basis of the separator 113.

Figure 3:
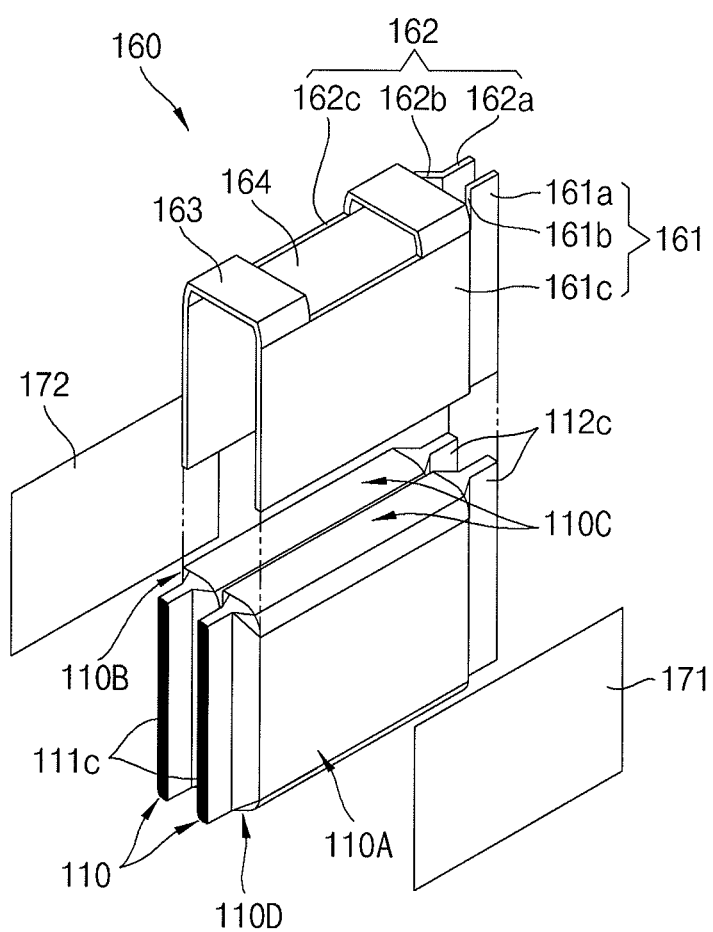
FIG. 3 illustrates a perspective view of the coupling relationship between the electrode assembly and the short circuit induction member in the rechargeable secondary battery according to an embodiment.

FIG. 3 illustrates a perspective view of the coupling relationship between the electrode assembly and the short circuit induction member in the rechargeable secondary battery according to an embodiment.

Referring to FIG. 3, the short circuit induction member 160 may have a shape which approximately surrounds the pair of electrode assemblies 110. In the present example embodiment, the short circuit induction member 160 includes a long side portion 161 covering the front long side area 110A of one electrode assembly 110, a long side portion 162 covering the rear long side area 110B of the other electrode assembly 110, and two short side portions 163 spaced from each other and connecting the pair of long side portions 161 and 162 to each other. The cut portion 164 is disposed between the two short side portions 163 spaced from each other. Each of the long side portions 161 and 162 is electrically connected to the second uncoated area 111c of each of the electrode assemblies 110.

Figure 4:
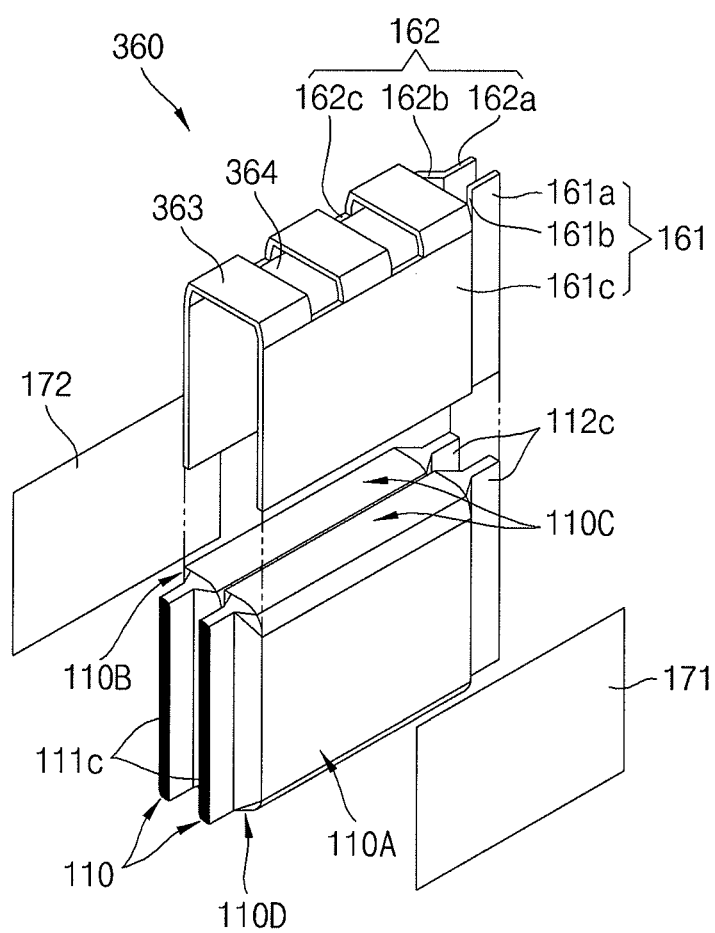
FIG. 4 illustrates a perspective view of a coupling relationship between an electrode assembly and a short circuit induction member in a rechargeable secondary battery according to another embodiment.

FIG. 4 illustrates a perspective view of a coupling relationship between an electrode assembly and a short circuit induction member in a rechargeable secondary battery according to another embodiment.

Referring to FIG. 4, a short circuit induction member 360 may include a pair of long side portions 161 and 162 and three short side portions 363 connecting the long side portions 161 and 162 to each other. Thus, the short side portions 363 may connect both side areas of the two long side portions 161 and 162 to each other and central areas of the two long side portions 161 and 162 to each other, respectively. Furthermore, two cut portions 364 may be defined between the three short side portions 263. Also, both short side portions 363 of the three short side portions 363 may be disposed at positions corresponding to those of fuses disposed in terminal parts, respectively.

Figure 5A:
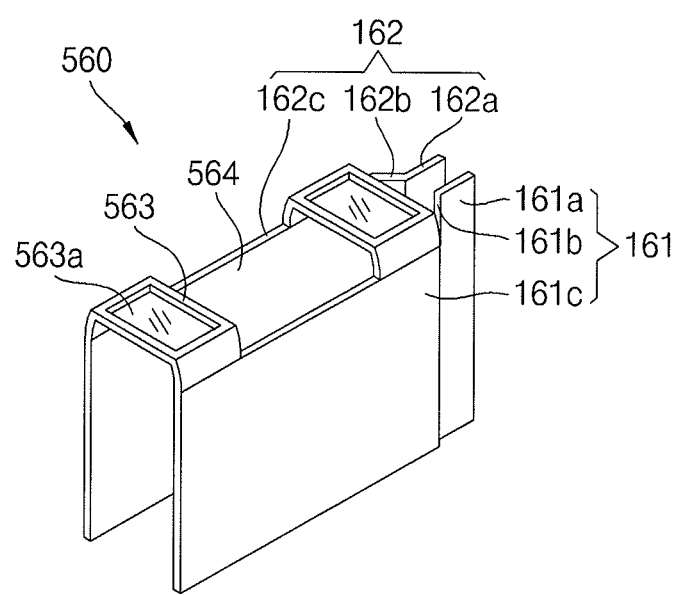
FIG. 5A illustrates a perspective view of a short circuit induction member of a rechargeable secondary battery according to another embodiment.
Figure 5B:
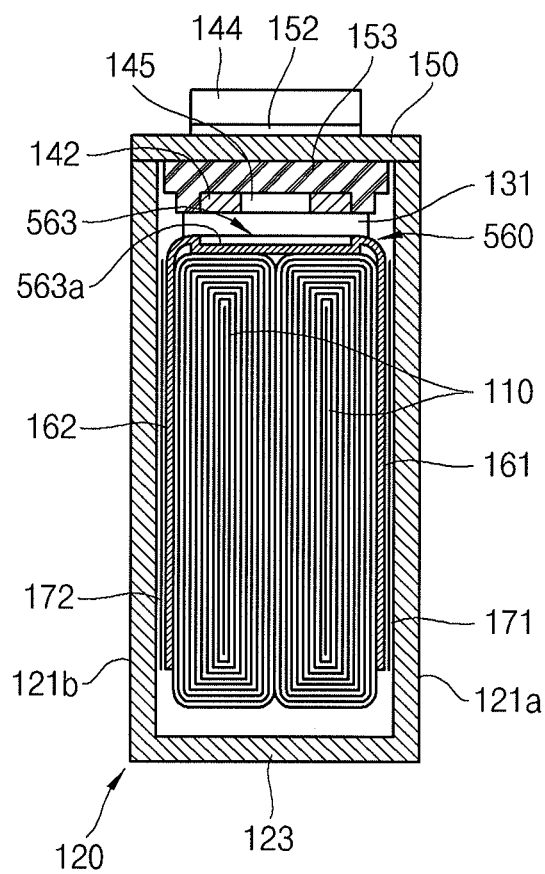
FIG. 5B illustrates a cross-sectional view of the rechargeable secondary battery.

FIG. 5A illustrates a perspective of a short circuit induction member of a rechargeable secondary battery according to another embodiment, and FIG. 5B illustrates a cross-sectional view of the rechargeable secondary battery.

Referring to FIGS. 5A and 5B, a short circuit induction member 560 may have a concave groove 563a having a predetermined depth in a short side portion 563 electrically and mechanically connecting a pair of long side portions 161 and 162 to each other. Although the concave groove 563a has an approximately square shape in FIG. 5A, the concave groove 563a may have various shapes such as, e.g., a triangular shape, a polygonal shape, a circular shape, etc. Also, the concave groove 563a may be defined in an area corresponding to that of a fuse provided in a terminal part. Thus, even when the fuse is melted by overcurrent when a rechargeable secondary battery is overcharged, an arc occurring from the fuse may be prevented from being transferred to an electrode assembly by the short side portion 563. In addition, a fuse-melted material may be received into the concave groove 563a defined in the short side portion 563. Thus, stability and reliability of the rechargeable secondary battery may be further improved.

Figure 6:
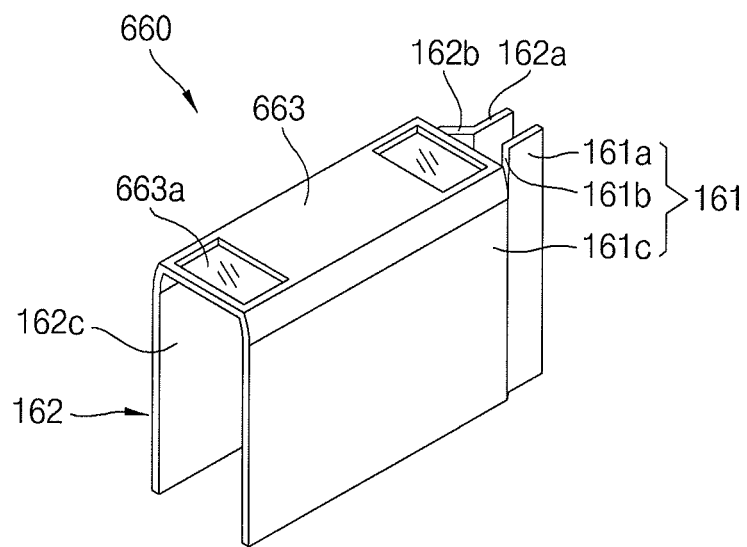
FIG. 6 illustrates a perspective view of a short circuit induction member of a rechargeable secondary battery according to another embodiment.

FIG. 6 illustrates a perspective view of a short circuit induction member of a rechargeable secondary battery according to another embodiment.

Referring to FIG. 6, in a short circuit induction member 660, the whole third areas 161c and 162c of a pair of long side portions 161 and 162 may be connected to each other by one short side portion 663. Two concave grooves 663a, each having a predetermined depth and being spaced from each other, may be defined in the short side portion 663. As described above, the concave grooves 663a may be defined in positions corresponding to those of fuses of a terminal part, respectively.

Figure 7:
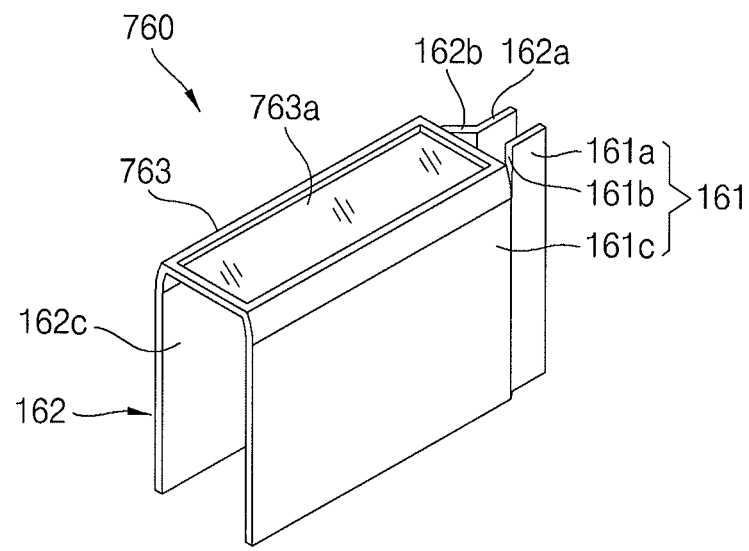
FIG. 7 illustrates a perspective view of a short circuit induction member of a rechargeable secondary battery according to another embodiment.

FIG. 7 illustrates a perspective view of a short circuit induction member of a rechargeable secondary battery according to another embodiment.

Referring to FIG. 7, one concave groove 763a having a predetermined depth and an approximately square shape may be defined in one short side portion 763 connecting the whole third areas 161c and 162c of long side portions 161 and 162 of a short circuit induction member 760. Accordingly, the concave groove 763a having a relatively large width may be defined in the short side portion 763 of the short circuit induction member 760. A distance L1 between the lower end of the insertion part 763 and the stepped part 763a is illustrated in FIG. 760. Even if a large amount of fuse-melted material is generated from a fuse of a terminal part, the concave groove 763a may receive the large amount of fuse-melted material.

By way of summation and review, tests such as a penetrating test, a squeezing test, an overcharging test are the harshest safety tests. Among these, the penetrating test may be important in predicting damage to a secondary battery due to a car accident. A nail penetrating test is performed under a harsh condition in which a nail penetrates a rechargeable secondary battery. The rechargeable secondary battery should not excessively overheat or catch fire after the nail penetrates the rechargeable secondary battery.

As described above, embodiments may provide a rechargeable secondary battery that can minimize heat generation and occurrence of fire when a nail penetrates the rechargeable secondary battery. According to the embodiments, a short circuit induction member includes the pair of long side portions and the one short side portion, and the pair of long side portions are electrically and mechanically connected to each other by the short side portion. Thus, the flow path of a short circuit current may be varied when the nail penetrates the rechargeable secondary battery. Thus, heat generation and the occurrence of a fire in the rechargeable secondary battery may be minimized when the nail penetrates the rechargeable secondary battery. Also, when the nail penetrates the rechargeable secondary battery, heat generated in the nail penetration region may be dispersed into a wide area along the short circuit induction member. Thus, the heat may not be concentrated into the nail penetration region.

According to embodiments, when the rechargeable secondary battery is overcharged so as to melt a fuse, the arc and fuse-melted material may be blocked from being transferred toward the electrode assembly by the short circuit induction member. Thus, the short circuit induction member may serve as a mask between the fuse and the electrode assembly. Thus, the occurrence of fire and gas generation, which may occur when the fuse of the rechargeable secondary battery is melted, may be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery, comprising,
an electrode assembly, the electrode assembly including a pair of electrodes and a separator interposed therebetween, the electrode assembly having a first side, a second side, a third side, and a fourth side, the second side of the electrode assembly being opposite the first side of the electrode assembly;
a short circuit induction member, the short circuit induction member being attached to and electrically connected to one electrode of the electrodes, the short circuit induction member including a first portion, a second portion, and a third portion, each of the first, second, and third portions having a common polarity that is the same as the polarity of the electrically connected electrode, the third side of the electrode assembly facing the third portion, the third portion mechanically and electrically connecting the first portion to the second portion, the electrode assembly being interposed between the first portion and the second portion such that the first side of the electrode assembly is between the first portion and the second side of the electrode assembly, the fourth side of the electrode assembly being at least partially exposed by the short circuit induction member;

a case, the electrode assembly, and the short circuit induction member being disposed in the case;

a cap plate, the cap plate closing an opening in the case, wherein the third portion of the short circuit induction member is interposed between the third side of the electrode assembly and the cap plate; and a terminal part, the terminal part including a current collector, a terminal, and a fuse, the fuse being formed on the current collector.

2. The battery as claimed in claim 1, wherein the fuse is disposed adjacent to the third portion of the short circuit induction member.

3. The battery as claimed in claim 2, wherein the third portion of the short circuit induction member includes a pocket therein, the pocket facing the fuse.

4. The battery as claimed in claim 3, wherein:
the third portion of the short circuit induction member has a length that is substantially the same as a length of the first portion and a length of the second portion, the third portion being connected to the first and second portions along their respective lengths, and
the pocket has a length that is substantially the same as a length of the third portion.

5. The battery as claimed in claim 1, wherein the second side of the electrode assembly is between the second portion of the short circuit induction member and the first side of the electrode assembly.

6. The battery as claimed in claim 1, wherein:
the case includes a pair of long side walls, each having an approximately flat shape, facing each other, a pair of short side walls connecting the long side walls to each other and facing each other, and one bottom wall connecting the long side walls to the short side walls,
the first side of the electrode assembly is disposed parallel to and facing one of the long side walls of the case, and the second side of the electrode assembly is disposed parallel to and facing the other of the long side walls of the case, and
the short circuit induction member substantially covers the first side and the second side of the electrode assembly.

7. The battery as claimed in claim 6, wherein the third portion of the short circuit induction member bridges the first portion and the second portion.

8. The battery as claimed in claim 7, wherein the short circuit induction member is a single piece that includes the first portion, the second portion, and the third portion.

9. The battery as claimed in claim 7, wherein the first, second, and third portions of the short circuit induction member are integrally formed.

10. The battery as claimed in claim 1, wherein:
the electrode assembly includes a pressed end at an uncoated portion of the one electrode, a thickness of the pressed end of the electrode assembly being less than a thickness of a coated portion of the electrode assembly, and
the short circuit induction member is attached to and electrically connected to the uncoated portion of the one electrode.

11. The battery as claimed in claim 10, wherein the first portion of the short circuit induction member has a first region and a second region, the first region extending along the first side of the electrode assembly, the second region being bent from the first region and extending along the pressed end of the electrode assembly.

12. The battery as claimed in claim 11, wherein the second portion of the short circuit induction member has a first region and a second region, the first region of the second portion extending along the second side of the electrode assembly, the second region of the second portion being bent from the first region of the second portion and extending along the pressed end, the pressed end being interposed between the second region of the second portion and the second region of the first portion.

13. The battery as claimed in claim 1, wherein the third portion of the short circuit induction member has a length that is less than a length of the first portion and a length of the second portion, such that the third portion exposes a portion of the third side of the electrode assembly.

14. The battery as claimed in claim 13, wherein the third portion of the short circuit induction member includes a first section and a second section, each of the first and second sections mechanically and electrically connecting the first portion to the second portion, the first section and the second section being spaced apart with a gap therebetween.

15. The battery as claimed in claim 1, wherein:
the case is electrically connected to another electrode of the electrodes, and
the short circuit induction member is interposed between the case and the electrode assembly.

16. A battery, comprising,
an electrode assembly, the electrode assembly including a pair of electrodes and a separator interposed therebetween, the electrode assembly having a first side, a second side, a third side, and a fourth side, the second side of the electrode assembly being opposite the first side of the electrode assembly;
a short circuit induction member, the short circuit induction member being attached to and electrically connected to one electrode of the electrodes, the short circuit induction member including a first portion, a second portion, and a third portion, each of the first, second, and third portions having a common polarity that is the same as the polarity of the electrically connected electrode, the third side of the electrode assembly facing the third portion, the third portion mechanically and electrically connecting the first portion to the second portion, the electrode assembly being interposed between the first portion and the second portion such that the first side of the electrode assembly is between the first portion and the second side of the electrode assembly, the fourth side of the electrode assembly being at least partially exposed by the short circuit induction member;
a case, the electrode assembly, and the short circuit induction member being disposed in the case;
a first terminal part, the first terminal part including a first current collector, a first terminal, and a first fuse, the first fuse being formed on the first current collector; and
a second terminal part, the second terminal part including a second current collector, a second terminal, and a second fuse, the second fuse being formed on the second current collector, wherein:
the third portion of the short circuit induction member has a length that is less than a length of the first portion and a length of the second portion, such that the third portion exposes a portion of the third side of the electrode assembly, the third portion of the short circuit induction member includes a first section and a second section, each of the first and second sections mechanically and electrically connecting the first portion to the second portion, the first section and the second section being spaced apart with a gap therebetween, the first fuse is disposed adjacent to the third side of the electrode assembly, the first section of the short circuit induction member being interposed between the first fuse and the third side of the electrode assembly, and the second fuse is disposed adjacent to the third side of the electrode assembly, the second section of the short circuit induction member being interposed between the second fuse and the third side of the electrode assembly.

17. The battery as claimed in claim 16, wherein:

the first section of the short circuit induction member includes a first pocket therein, the first pocket facing the first fuse, and the second section of the short circuit induction member includes a second pocket therein, the second pocket facing the second fuse.

18. A battery, comprising, an electrode assembly, the electrode assembly including a pair of electrodes and a separator interposed therebetween, the electrode assembly having a first side, a second side, a third side, and a fourth side, the second side of the electrode assembly being opposite the first side of the electrode assembly;

a short circuit induction member, the short circuit induction member being attached to and electrically connected to one electrode of the electrodes, the short circuit induction member including a first portion, a second portion, and a third portion, each of the first, second, and third portions having a common polarity that is the same as the polarity of the electrically connected electrode, the third side of the electrode assembly facing the third portion, the third portion mechanically and electrically connecting the first portion to the second portion, the electrode assembly being interposed between the first portion and the second portion such that the first side of the electrode assembly is between the first portion and the second side of the electrode assembly, the fourth side of the electrode assembly being at least partially exposed by the short circuit induction member;

a case, the electrode assembly, and the short circuit induction member being disposed in the case, wherein:

the third portion of the short circuit induction member has a length that is less than a length of the first portion and a length of the second portion, such that the third portion exposes a portion of the third side of the electrode assembly, the third portion of the short circuit induction member includes a first section and a second section, each of the first and second sections mechanically and electrically connecting the first portion to the second portion, the first section and the second section being spaced apart with a gap therebetween, the third portion of the short circuit induction member further includes a third section that mechanically and electrically connects the first portion to the second portion, the third section being between the first section and the second section, the first section and the third section are spaced apart with a first gap therebetween, and the third section and the second section are spaced apart with a second gap therebetween.

* * * * *